United States Patent
Naitoh

(10) Patent No.: US 7,627,660 B2
(45) Date of Patent: Dec. 1, 2009

(54) INFORMATION PROCESSING APPARATUS, INFORMATION PROCESSING METHOD, PROGRAM, AND RECORDING MEDIUM

(75) Inventor: Yoshiko Naitoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 914 days.

(21) Appl. No.: 10/608,160

(22) Filed: Jun. 30, 2003

(65) Prior Publication Data

US 2004/0010325 A1 Jan. 15, 2004

(30) Foreign Application Priority Data

| Jul. 12, 2002 | (JP) | ............................. 2002-204284 |
| Jun. 13, 2003 | (JP) | ............................. 2003-169191 |

(51) Int. Cl.
*G06F 15/173* (2006.01)

(52) U.S. Cl. ............................. 709/223; 705/28; 714/4; 709/224; 235/385

(58) Field of Classification Search .................. 705/28; 714/4; 709/224; 235/385
See application file for complete search history.

(56) References Cited

U.S. PATENT DOCUMENTS

| 5,471,617 | A | * | 11/1995 | Farrand et al. .............. 718/100 |
| 5,687,301 | A | * | 11/1997 | Stokes et al. ................ 358/1.13 |
| 6,148,329 | A | * | 11/2000 | Meyer ......................... 709/206 |
| 6,425,006 | B1 | * | 7/2002 | Chari et al. .................. 709/224 |
| 6,636,983 | B1 | * | 10/2003 | Levi .............................. 714/4 |
| 6,711,154 | B1 | * | 3/2004 | O'Neal ........................ 370/352 |
| 6,714,976 | B1 | * | 3/2004 | Wilson et al. ............... 709/224 |
| 6,832,341 | B1 | * | 12/2004 | Vijayan ........................ 714/43 |
| 2001/0029474 | A1 | * | 10/2001 | Yada ............................ 705/28 |
| 2003/0079132 | A1 | * | 4/2003 | Bryant ........................ 713/182 |
| 2003/0093521 | A1 | * | 5/2003 | Schlonski et al. ........... 709/224 |
| 2003/0154199 | A1 | * | 8/2003 | Thomas et al. ................ 707/10 |
| 2003/0154404 | A1 | * | 8/2003 | Beadles et al. .............. 713/201 |
| 2003/0165230 | A1 | * | 9/2003 | Reuss .................... 379/265.02 |
| 2004/0162893 | A1 | * | 8/2004 | Brown et al. ................. 709/222 |
| 2005/0234996 | A1 | * | 10/2005 | Carpentier et al. ........ 707/104.1 |
| 2006/0143344 | A1 | * | 6/2006 | Lindsay et al. .............. 710/105 |

FOREIGN PATENT DOCUMENTS

| JP | 2000-312211 | 11/2000 |
| JP | 2001-290937 | 10/2001 |
| JP | 2002-108734 | 4/2002 |

OTHER PUBLICATIONS

Japanese Office Action dated May 30, 2006 issued in counterpart JP application.

* cited by examiner

*Primary Examiner*—Dohm Chankong
*Assistant Examiner*—Tauqir Hussain
(74) *Attorney, Agent, or Firm*—Fitzpatrick, Cella, Harper & Scinto

(57) ABSTRACT

A scheme is provided for managing device identification information of an image forming apparatus used by a client. A combination of first device identification information and second device identification information which are obtained from a predetermined device is compared with another combination. In accordance with the comparison result, a notification is issued to a remote monitoring computer that is capable of receiving the notification through a predetermined communications line and that manages a plurality of information processing apparatuses, thereby allowing for prompt processing at the remote monitoring computer.

7 Claims, 12 Drawing Sheets

FIG. 6

| IP ADDRESS | MAC ADDRESS |
|---|---|
| 192.168.10.13 | 008500123456 |
| 192.168.0.1 | 008500123480 |
| 192.168.0.2 | 008500123479 |

FIG. 7

| DEVICE MANAGEMENT PC | ID | A000123456Z | — 701 |

| NUMBER OF DEVICES | 03 |

| PRODUCT NAME | Product XX |
|---|---|
| IP ADDRESS | 192.168.0.12 — 702 |
| MAC ADDRESS | 008500123456 — 703 |
| DEVICE ID | DEV00003 |
| ... | |

| PRODUCT NAME | Product AA |
|---|---|
| IP ADDRESS | 192.168.0.1 — 704 |
| MAC ADDRESS | 008500123478 — 705 |
| DEVICE ID | DEV00004 |
| ... | |

| PRODUCT NAME | Product AA |
|---|---|
| IP ADDRESS | 192.168.0.2 |
| MAC ADDRESS | 008500123479 |
| DEVICE ID | DEV00005 |
| ... | |

FIG. 10

| 1001 | 1002 | 1003 |
|---|---|---|
| | | CHANGE INFORMATION |
| TYPE OF NOTIFICATION INFORMATION | DEVICE-IDENTIFICATION-INFORMATION CHANGE NOTIFICATION | |
| DEVICE MONITORING COMPUTER ID | A0001234567 | |
| DEVICE ID | DEV00003 | |
| IP ADDRESS | 192.168.0.67 | CHANGED |
| MAC ADDRESS | 0085 00123456 | UNCHANGED |

1004
1005
1006
1007
1008

INFORMATION PROCESSING APPARATUS, INFORMATION PROCESSING METHOD, PROGRAM, AND RECORDING MEDIUM

BACKGROUND OF THE INVENTION

1. Field of the Invention

The present invention relates to a scheme for managing devices, such as an information processing apparatus, a copier, a printer, and a computer which are located at remote places.

2. Description of the Related Art

A remote maintenance system for managing and operating devices, such as copiers, printers, and computers, by associating them with IP (internet protocol) addresses has been conventionally known. For example, Patent Document 1 discloses a technology in which it is determined whether or not a MAC address and an IP address are those of an asset being managed and an alarm notification is issued to an administrator, user, or the like when the MAC address and the IP address are not being managed.

Meanwhile, for ease of management of history information such as the number of sheets printed or copied by a printer, copier, or digital multi-functional equipment and the use status of consumables, a scheme for managing log information by using IP addresses and by obtaining, for example, corresponding MAC addresses, product names, and device IDs based on the IP addresses is known. Reasons why devices are managed based on IP addresses are that IP addresses correspond to devices being managed on a one-to-one basis and can be assigned by an administer to allow for easy recognition of an association with the corresponding devices, unlike MAC addresses. In addition, MAC addresses, though unique to individual apparatuses, are complicated since they are 12-digit hexadecimal numbers, and, on the other hand, the use of product names causes inconvenience in management since the same product may be redundantly managed.

Patent Document 1: Japanese Patent Laid-Open No. 2001-290937 (United States Patent Application No. 20010029474)

In a configuration in which various types of information such as consumable information and an equipment status are managed by associating such information with device identification information such as an IP address, when the IP address is changed, the held information can become meaningless unless appropriate processing is performed. Specifically, for example, when a different device (a device B) is assigned to the same IP address, management of history information based on the IP address results in accumulation of the history of the original device (a device A) based on the history of the device B, thereby causing a critical mistake in history management.

In general, possible causes for a change of correspondence of an IP address or MAC address include movement of a device to a different subnet and a replacement of a device with a new one.

The foregoing problems cannot be overcome by a technology, as disclosed in Patent Document 1 described above, in which checking is only performed to determine whether or not a MAC address and an IP address are those of an asset being managed. That is, such a technology does not clarify which one of the IP address and the MAC address is found to be abnormal, and only issuing an alarm indicating that some abnormality is found causes a problem in that subsequent measures and various necessary processes cannot be promptly performed to cope with the abnormality.

In particular, maintenance of an image forming apparatuses involves management of accounting information such as the number of sheets printed, copied, or the like. Thus, the lack of ability of effectively detecting an abnormal IP address and/or MAC address can cause a problem in management of accounting information.

SUMMARY OF THE INVENTION

In view of the foregoing, the present invention has been made to overcome the problems described above and an object of the present invention is to provide a scheme in which, when a mismatch of correspondence of, for example, an IP address and/or MAC address is detected, a warning indicating the status thereof can be promptly and appropriately issued to an administer or a maintenance service provider.

To achieve the above object, the present invention provides a scheme in a remote monitoring system for an image forming apparatus. The scheme includes an information processing apparatus that manages a predetermined device capable of performing communication over a network. The information processing apparatus: (1) holds corresponding information corresponding to first device identification information and second device identification information: (2) obtains accounting information based on an image forming operation from the predetermined device: (3) compares a combination of the first device identification information and the second device identification information which are obtained from the predetermined device with the held corresponding information, and determines whether or not at least one of the first device identification information and the second device identification information is being managed. In accordance with a result of the comparison, the information processing apparatus controls issuance of a notification to an external apparatus. The external apparatus can receive the notification through a predetermined communications line and manages a plurality of information processing apparatuses. The held corresponding information is updated in accordance with an update notification, for updating the combination of the first device identification information and the second device identification information, from the external apparatus, and the notification issued includes information indicating that either the first device identification information or the second device identification information is not being managed. The issuance of the obtained accounting information to the external apparatus is restricted if it is determined that either the first device identification information or second device identification information is not being managed, and is not restricted if the corresponding information is updated.

Further objects, features and advantages of the present invention will become apparent from the following description of the preferred embodiments with reference to the attached drawings.

BRIEF DESCRIPTION OF THE DRAWINGS

FIG. 6 is an exemplary table showing management data including IP addresses and MAC addresses associated therewith.

FIG. 7 is a table showing an exemplary format of management data held by the information processing apparatus.

FIG. 10 shows abnormality notification content that is transmitted from a device management computer to the remote monitoring computer.

DESCRIPTION OF THE PREFERRED EMBODIMENTS

First Embodiment

Figure 1:
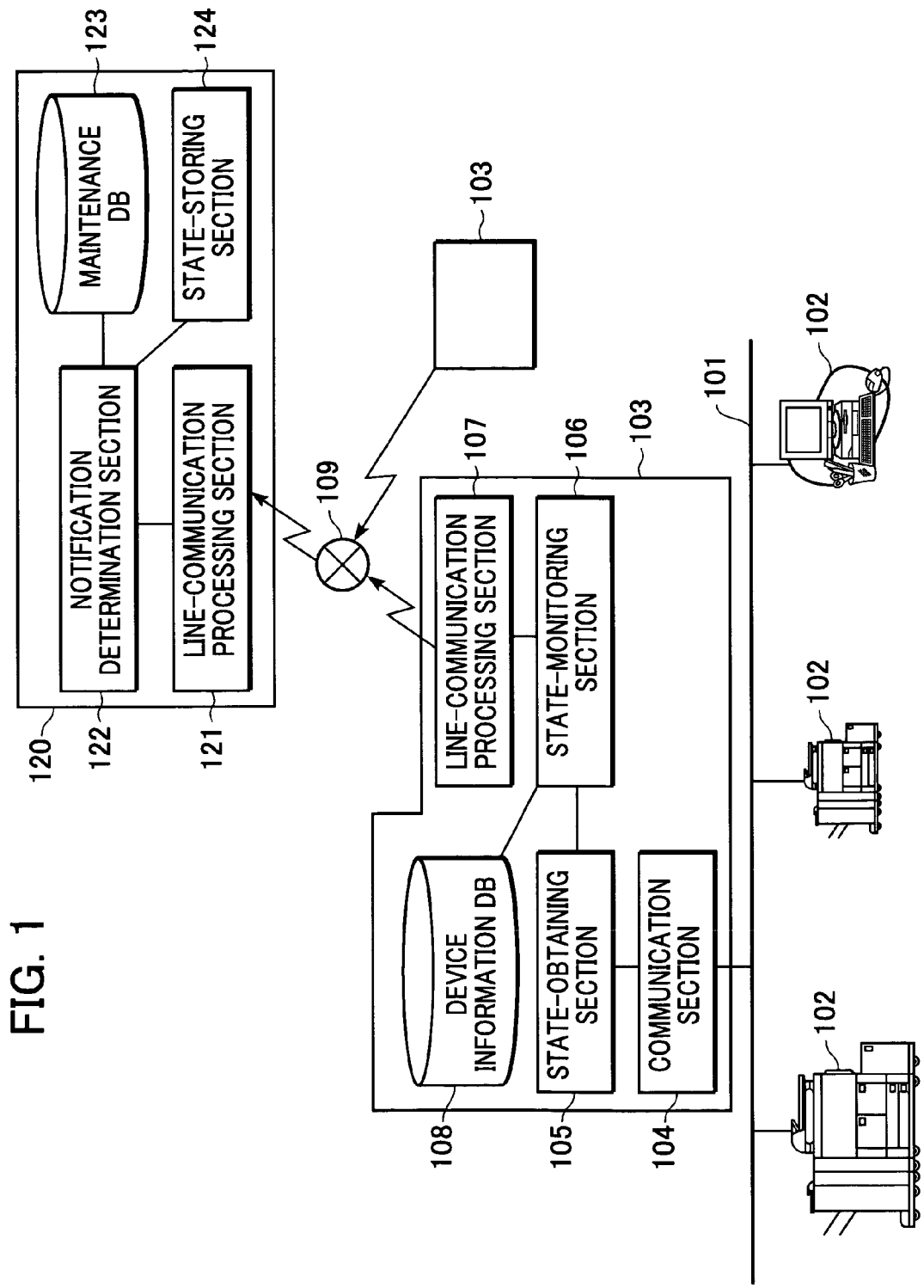
FIG. 1 is a schematic view of an overall configuration of a first embodiment.

FIG. 1 is a schematic view of an overall configuration according to the present invention. Reference numeral 101 indicates a network, which is a communications line that interconnects devices and a computer managing the devices such that they can communicate with each other. The network 101 may be implemented with a 10Base-T Ethernet® cable and/or an IEEE802.11b wireless LAN.

Reference numeral 102 indicates devices connected to the network 101. Each device 102 may be implemented as an information processing apparatus, such as a personal computer (not shown), or an image forming apparatus, such as a printer, facsimile machine, or digital multi-functional equipment. As a printing system of the device 102 serving as an image forming apparatus, a well-known system, such as an electrophotographic system, inkjet system, or sublimation system, may be employed.

Reference numeral 103 indicates device management computers. Each device management computer 103 manages and monitors some or all of the devices 102. Typically, the device management computer 103 is placed at the same organization as the plurality of devices 102, and can communicate with and manage the devices 102, which are connected between network segments and different subnets.

Reference numeral 104 is a communication section that allows the device management computer 103 to communicate with the devices 102 and reference numeral 105 is a state-obtaining section that obtains the state of the devices 102 via the communication section 104.

Reference numeral 106 is a state-monitoring section for monitoring the states of the devices 102, and reference numeral 108 is a database for storing information about the devices 102.

Reference numeral 107 is a line-communication processing section that allows the device management computers 103 to communicate with a remote monitoring computer 120. Reference numeral 109 is a communications line that interconnects the device management computer 103 and the remote monitoring computer 120. The communications line 109 may be implemented with an already-available wireless communications line, such as a telephone line, fiber-optic cable, or wireless channel.

The remote monitoring computer 120 remotely monitors the devices 102 via the device management computer 103. Reference numeral 121 is a line-communication processing section that allows the remote monitoring computer 120 to communicate with the device management computer 103, and reference numeral 124 is a state-storing section for storing the states of the devices 102. Typically, the remote monitoring computer 120 is placed at an organization different from the organization where the device management computer 103 is located.

Reference numeral 122 is a notification determination section, which compares a device's state received via the line-communication processing section 121 with a corresponding previous device's state that is stored in the state-storing section 124 to thereby determine whether or not to notify maintenance personnel.

Reference numeral 123 is a maintenance database (DB) that is searched by the notification determination section 122 for maintenance personnel in charge of the corresponding device 102.

Each of the sections may be configured with only a hardware module or may be implemented by cooperation of a hardware module and a software module.

Figure 2:
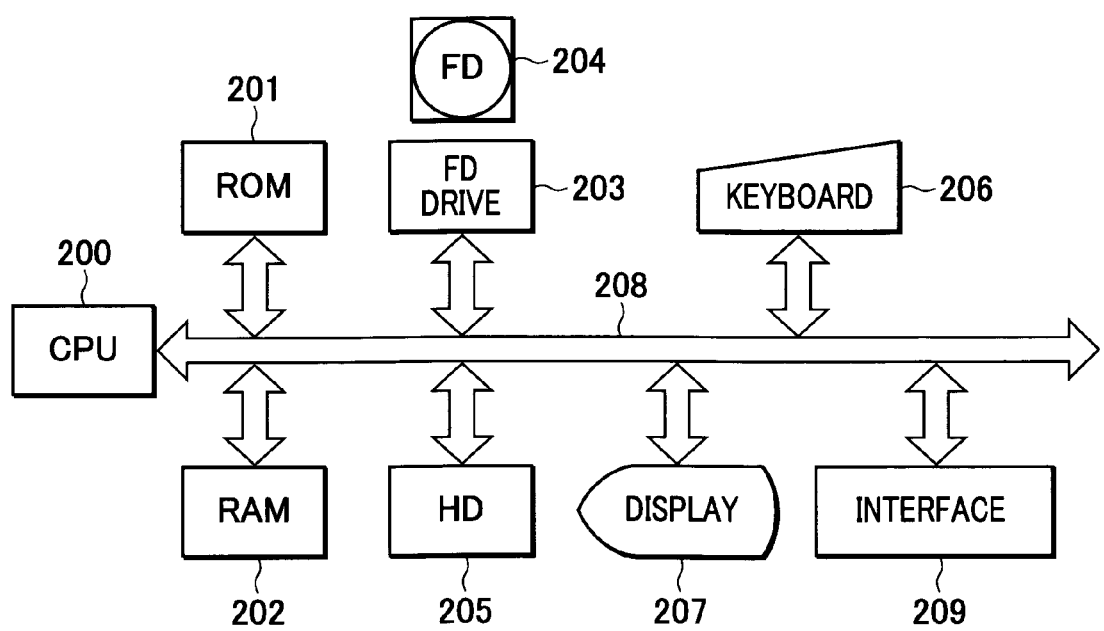
FIG. 2 is a block diagram of a general configuration of an information processing apparatus.

FIG. 2 is a block diagram illustrating the configuration of an information processing apparatus according to the present invention, and the configuration thereof corresponds to that of each of the devices (personal computers) 102, the device management computers 103, and the remote monitoring computer 120 which are shown in FIG. 1. In practice, each module shown in FIG. 1 is operated such that a CPU (central processing unit) 200, shown in FIG. 2, executes a control program stored in a storing section (e.g., indicated by reference numeral 201 or 205) to perform processing for the functions of the individual blocks shown in FIG. 2.

Referring to FIG. 2, the CPU 200 serves as controlling means of the information processing apparatus. The CPU 200 executes an application program, a printer-driver program, an operating system (OS), and a network-printer control program of the present invention, which are stored in a hard disk (HD) 205, and also controls a RAM (random access memory) 202 to temporarily store, for example, a file and information needed to execute those programs.

Reference numeral 201 is a ROM (read only memory), which is storing means to store therein programs, such as a basic I/O (input/output) program, and various types of data, such as font data and template data used for document processing. The RAM 202, which is temporary storing means, serves as a main memory, work area, and the like for the CPU 200.

Reference numeral 203 indicates a floppy® disk drive (FD drive), which is recording-medium reading means. In a floppy disk (FD) 204, which is a recording medium, a computer-readable program is stored. The FD drive 203 can load a program or the like stored in the floppy disk 204 into the computer system. The recording medium, however, is not limited to a floppy disk, and may be any medium, such as a CD-ROM, CD-R, CD-RW, PC card, DVD, IC memory card, MO, or memory stick.

Reference numeral 205 is a hard disk (HD), which is one external storing means to serve as large-capacity storage to store an application program, printer-driver program, OS, network-printer control program, relevant program, and the like.

Reference numeral 206 indicates a keyboard, which is instruction inputting means to allow a user to give an instruction, such as a device-control command, to a client computer or to allow an operator or administrator to given an instruction to a printer server.

Reference numeral 207 indicates a display, which is displaying means to display, for example, command input from the keyboard 206 and the state of a printer. In practice, an application program issues a drawing command via an OS architecture and a graphics card interprets the command and converts it into an analog signal, thereby displaying information on the displaying means 207. It is to be noted that "display control" herein includes an instruction itself for issuing a drawing command for displaying information on the displaying means via the OS.

While a detailed description will be given below, various types of information transmitted through the communications line are displayed on the displaying means 207.

Reference number 208 indicates a system bus engaged in the flow of data within the computer, which may be a client computer or a printer server.

Reference numeral 209 is an interface, which is input/output means. This information processing apparatus exchanges data with an external apparatus via the interface 209.

Figure 3:
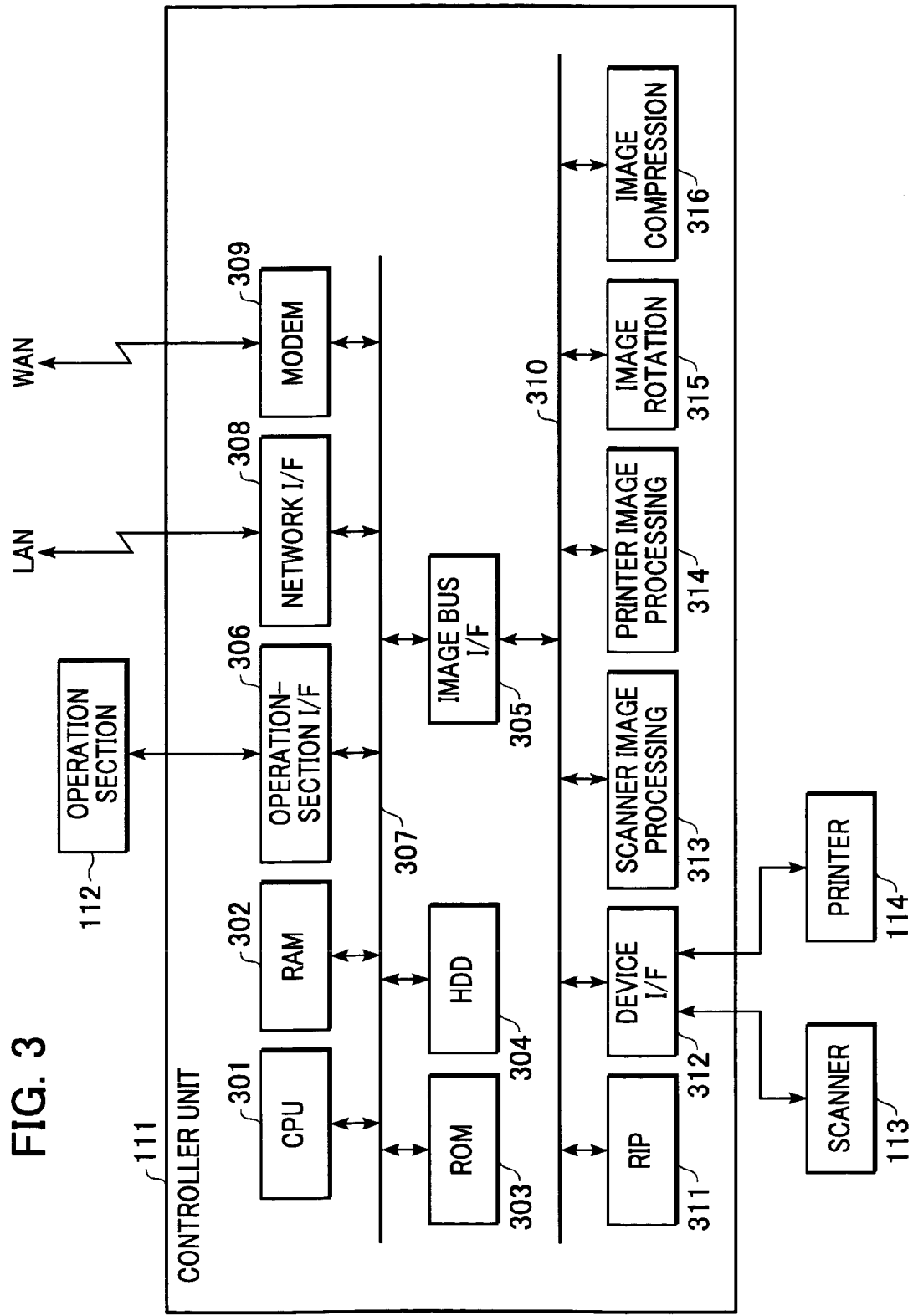
FIG. 3 is a block diagram of the configuration of an image forming apparatus.

FIG. 3 is a block diagram showing a detailed configuration of an image forming apparatus which is one example of the device in the present invention.

A controller unit 111 is connected to a scanner 113, which is an image inputting device, and a printer 114, which is an image outputting device, and, on the other side, is connected to a local area network (LAN) and a wide area network (WAN), to serve as a controller for inputting and outputting image information and device information.

A CPU 301 is a controller for controlling the entire system. A RAM 302 is a system working memory that is used for the operation of the CPU 301. The RAM 302 also serves as an image memory for temporarily storing image data. A ROM 303 is a boot ROM to store a boot program for the system. A hard disk drive (HDD) 304 stores system software and image data. The ROM 303 or HDD 304 stores identification information, such as an IP (internet protocol) address and a MAC address, in an available format for identifying a device.

An operation-section interface (I/F) 306 is engaged in interfacing with an operation section 112 and transmits, to the operation section 112, image data to be displayed at the operation section 112. The operation-section interface 306 also serves to transfer, to the CPU 301, information input by a user via the operation section 112.

A network interface (I/F) 308 is engaged in connection with a local area network (LAN), which corresponds to the network 101 in FIG. 1, and transmits and receives information to and from the LAN 101. For example, when receiving a query for device identification information, including an IP address and MAC address, from an external information processing apparatus (e.g., the device management computer 103 shown in FIG. 1), the controller unit 111 gives a response of device identification information via the network interface 308. The controller unit 111 can cause printing data, transmitted from one of the external apparatuses 102 via the network interface 308, to be printed out.

A MODEM 309 is engaged in connection with a wide area network and allows information to be transmitted to and received from, for example, the wide area network 109 (which may be an exclusive line) shown in FIG. 1. The components described above are arranged on a system bus 307.

An image bus interface (I/F) 305 is a bus bridge to provide connection between the system bus 307 and an image bus 310, which transfers image data at a high rate, and to convert a data structure. The image bus 310 is implemented with a PCI bus or an IEEE-1394 bus.

A raster image processor (RIP) 311, a device interface (I/F) 312, a scanner-image processing section 313, a printer-image processing section 314, an image rotating section 315, and an image compressing section 316 are arranged under the image bus 310. The raster image processor 311 expands a PDL (page description language) code transmitted over the network into a bitmap image. The device interface 312 provides connection between the controller unit 111 and the image input/output devices, including the scanner 113 and the printer 114, and converts image data in a synchronous or asynchronous manner.

The scanner-image processing section 313 corrects, processes, and edits input image data. The printer-image processing section 314, for example, corrects image data to be output to the printer 114 and changes the resolution of the image data. The image rotating section 315 rotates the image data. The image compressing section 316 performs JPEG compression/decompression on multivalued image data and performs JBIG, MMR, or MH compression/decompression on binary image data.

In the block diagram in FIG. 3, while the image forming apparatus having a built-in network communication capability (indicated by reference numeral 308), i.e., an image forming apparatus having an on-board network-capability, is illustrated, another known image forming apparatus taking a different form may also be used. For example, the network capability may be realized using an image forming apparatus having a built-in Centronics-compatible local interface and installing an optional detachable network interface card (hereinafter referred to as a "NIC").

Thus, in an image forming apparatus having no local-network interface, a capability corresponding to the network interface 308 shown in FIG. 3 is realized by installing a NIC. A brief description of a NIC will now be described with reference to FIG. 4.

Figure 4:
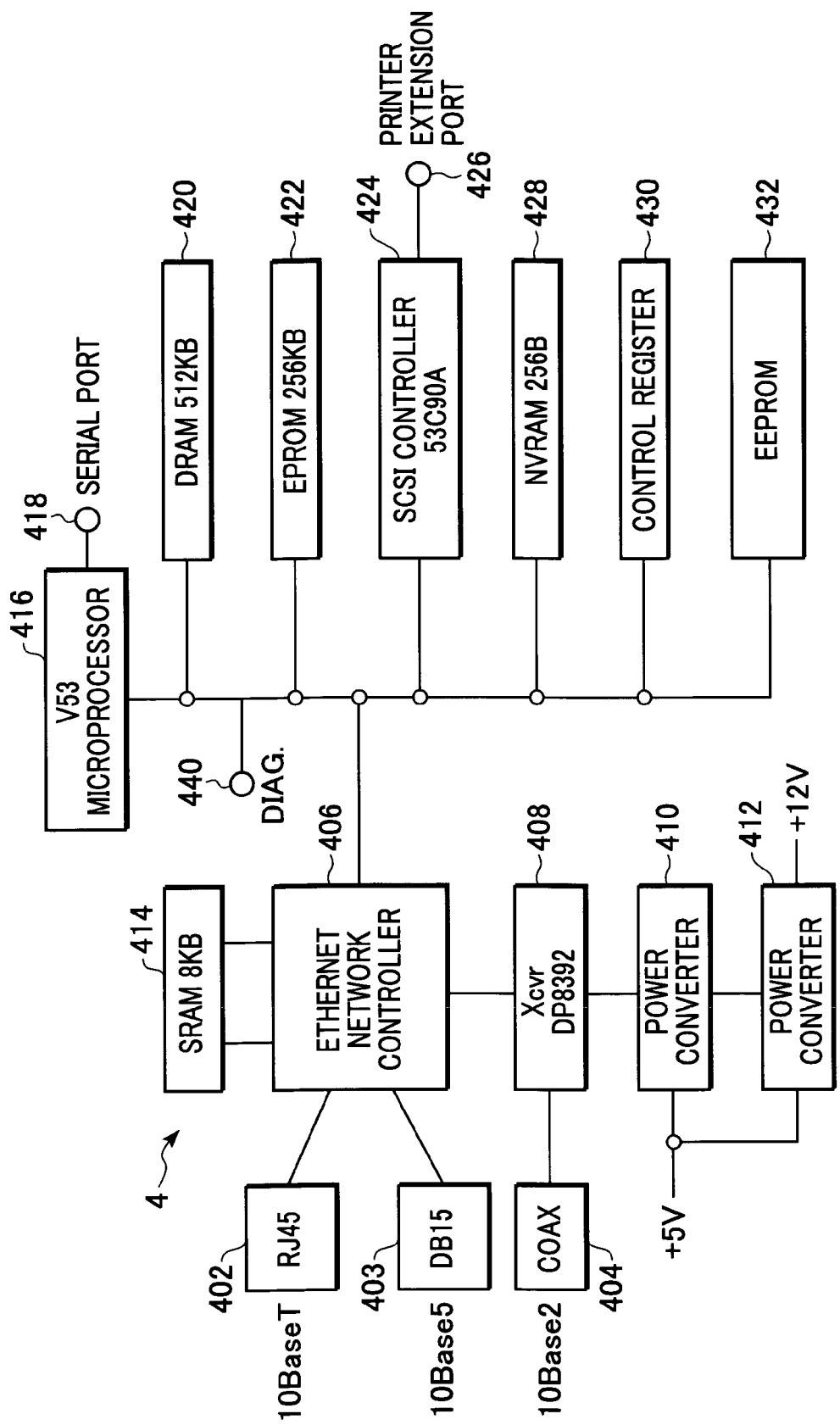
FIG. 4 is a block diagram of the configuration of a network interface card.

FIG. 4 is a block diagram of major components of a NIC 4. The NIC 4 is connected to a LAN (not shown) via network connectors 402, 403, and 404. The network connector 402 is preferably an RJ-45 connector that allows for 10Base-T connection. To enable 10Base-5 connection, the network connector 403 is implemented with a DB-15 connector, whereas the network connector 404 may be a simple coaxial connector that allows for 10Base-2 connection. All of the network connectors 402, 403, and 404 are connected to a network controller 406 (which is preferably an Ethernet® network controller). The network connector 404, however, is connected to the network controller 406 via a transceiver 408.

A power supply is supplied to the NIC 4 from a +5 V power supply of a printer (an image forming apparatus main-unit) via a printer expansion port 426. The +5 V power supply is also supplied to power converters 410 and 412. The power converter 412 supplies a +12 V power supply to an EPROM (erasable programmable read-only memory) 422 to flash or load it, whereas the power converter 410 supplies a −9 V power supply to the transceiver 408. The network controller 406 is also connected to an 8 KB SRAM 414.

The heart of the NIC 4 is a microprocessor 416, which is connected to a serial port 418. Also connected to the microprocessor 416 are a DRAM 420, a flash-EPROM 422, a SCSI controller 424, the printer expansion port 426, a failure-diagnostic LED 440, a nonvolatile RAM 428, a control register 430, and an EEPROM (electrically erasable programmable read-only memory) 432. The SCSI controller 424 is used for connection with a printer. The EEPROM 432, which is erasable volatile storing means, stores a media access control (MAC) address that has a unique name assigned to each Ethernet® board. When receiving a query for device identification information from an external apparatus (e.g., the device management computer 103 in FIG. 1), the NIC 4 transmits corresponding information (e.g., a MAC address, hardware ID, and IP address) stored in the EEPROM 432 to the external apparatus through the communications line.

Next, processing for managing device identification information will be described in detail with reference to the flow chart shown in FIG. 5. Each step of the processing in the flow chart of FIG. 5 is accomplished such that a CPU (which corresponds to the CPU 200 in FIG. 2) of the device management computer 103 or the device 102 reads and executes a program stored in a storing section (which corresponds to the ROM 201 or the HD 205 in FIG. 2).

First, in step S501, a determination is made as to whether or not a search start time, which is preset in the apparatus, has been reached. When it is determined that the search start time has not been reached, the process ends. When it is otherwise determined that the search start time has been reached, the process proceeds to step S502.

Figure 5:
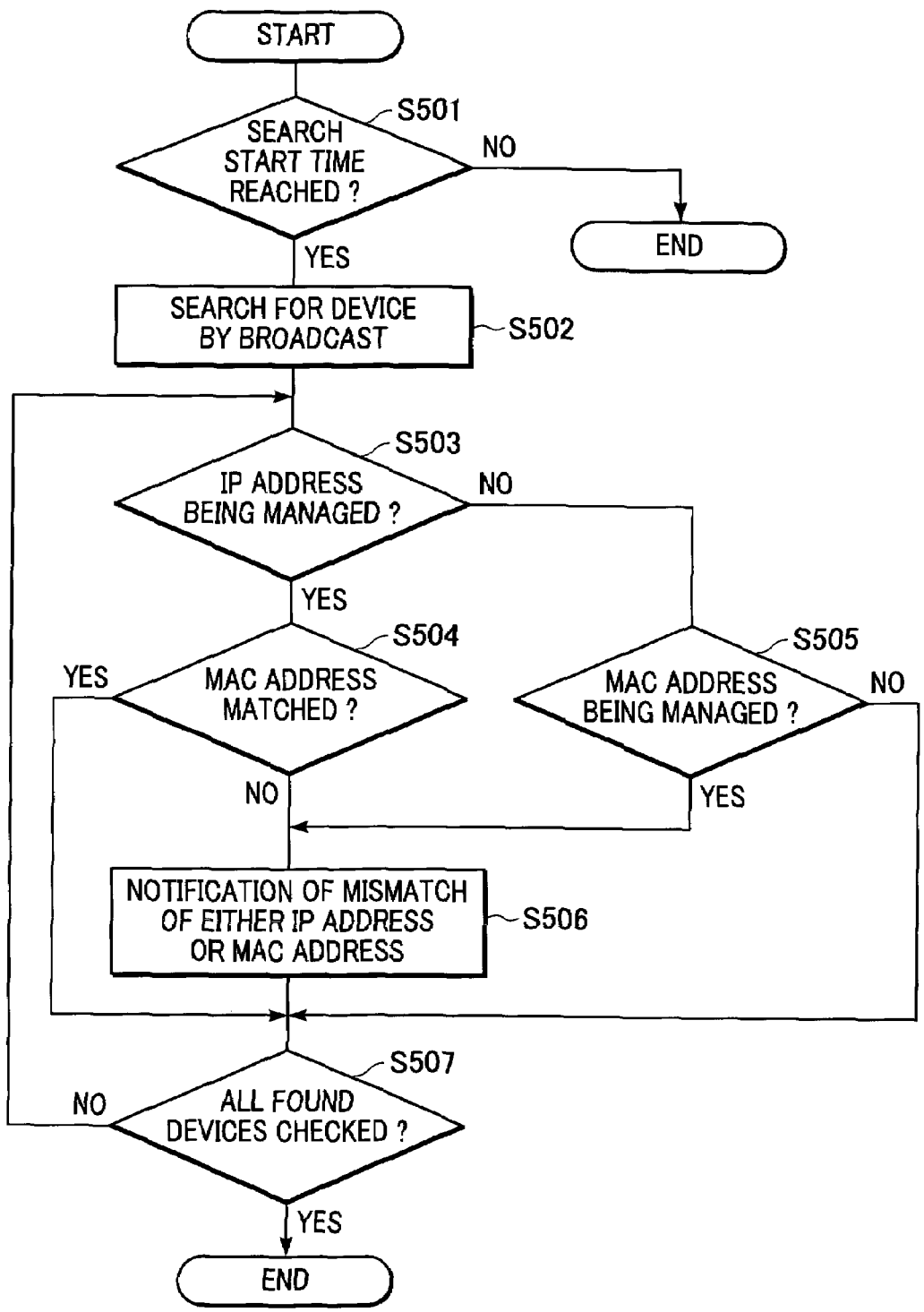
FIG. 5 is a flow chart showing the processing of an IP address change notification.

In this case, when one search time is set at a predetermined time, the processing shown in FIG. 5 may be executed once a day. The processing shown in FIG. 5 may also be executed in response to an instruction, transmitted from the remote monitoring computer 120 through the communications line, for executing the flow shown in FIG. 5. In such a case, the process in step S501 can be replaced with a process for determining whether or not the remote monitoring computer 120 issues an instruction for process execution.

In step S502, devices in each network segment to which devices 102 being managed are connected are searched for by SNMP broadcast, for which an MIB (management information base) that allows for identification of a device is used, such as "SysObjectID". Then, information including at least an IP address (first device identification information) and a MAC address (second device identification information), as shown in FIG. 6, is obtained in accordance with information issued from each device 102 through the communications network.

When a source device 102 of an IP address and MAC address has a configuration with a communication capability as shown in FIG. 3, the device 102 issues the IP address and MAC address of the device 102, and also when a source device 102 is provided with a NIC 4 as shown in FIG. 4, the device 102 issues the IP address and the MAC address of the NIC 4.

In steps S503 and S504, processing is performed for comparing a combination of first device identification information and second device identification information which are obtained from the device 102 with a combination held by the device management computer 103.

More specifically, in step S503, a determination (identification) is made as to whether the IP address of the found device 102 is being managed, by referring to a relational table, which is described below and shown in FIG. 7.

When it is determined in step S503 that the IP address of the found device 102 is being managed, a determination is made in step S504 as to whether the MAC address obtained by searching in step S502 matches a MAC address that is combined with the matched IP address in the relational table in FIG. 7.

When it is determined that they match each other, a determination is made in step S507 as to whether checking of all found devices has been completed. When it is determined "Yes", the flow shown in FIG. 5 ends. When it is otherwise determined in step S507 that all found devices have not been checked, the processes subsequent to step S503 are repeated.

On the other hand, when it is determined in step S504 that the MAC address does not match, in step S506, communication control is performed for controlling issuance of a notification to an external apparatus that can communicate through a predetermined communications line, in accordance with the results of the comparison processes in steps S503, S504, and S504. Specifically, a process for issuing a notification, to the remote monitoring computer 120, indicating that the either the IP address or the MAC address does not match information held by the device management computer 103.

On the other hand, when it is determined in step S503 that the IP address is not being managed and it is determined in step S505 that the MAC address is being managed, in step S506, a notification indicating that either the IP address or the MAC address does not match information held by the device management computer 103 is issued to the remote monitoring computer 120 through the communication line 109.

In this manner, in the processing of steps S503, S504, and S505, checking can be efficiently performed as to whether at least one of the IP address (first device identification information) and the MAC address (second device identification information) is being managed.

In step S505, when it is determined "NO", the device is determined as a device not being managed and the process proceeds to step S507.

In addition to information indicating that either an IP address (first device identification information) or a MAC address (second device identification information) does not match, the notification issued in step S506 includes, for example, information indicating which of the IP address and the MAC address does not match, the ID of the device management computer 103, and date information including time of execution of step S502. It is to be noted that the address of the remote monitoring computer 120 is pre-stored, as information of a notification destination, in the device management computer 103.

While the above description has been given in conjunction with an IP address and MAC address as information for identifying a device, the present invention does not restrict the device identification information to the illustrated example. For example, the identification information may be such that the first device identification information is an IP address and the second device identification information is a device ID or product name. When the MAC address is replaced with a device ID or product name, processes therefor are analogous to the processes shown in the flow chart of FIG. 5 and the information-acquisition process shown in FIG. 6 for the MAC address. Thus, detailed descriptions thereof will be omitted.

A specific example of reference information to which reference is made during the flow of FIG. 5 will now be described with reference to FIG. 7. FIG. 7 shows an exemplary format of management information that is stored in a database (storing section) of the device management computer 103 and/or a database of a database remote monitoring computer 120. Each of the information processing apparatuses (e.g., 102, 103, and 120) can display on its display the content as that shown in FIG. 7.

Figure 8:
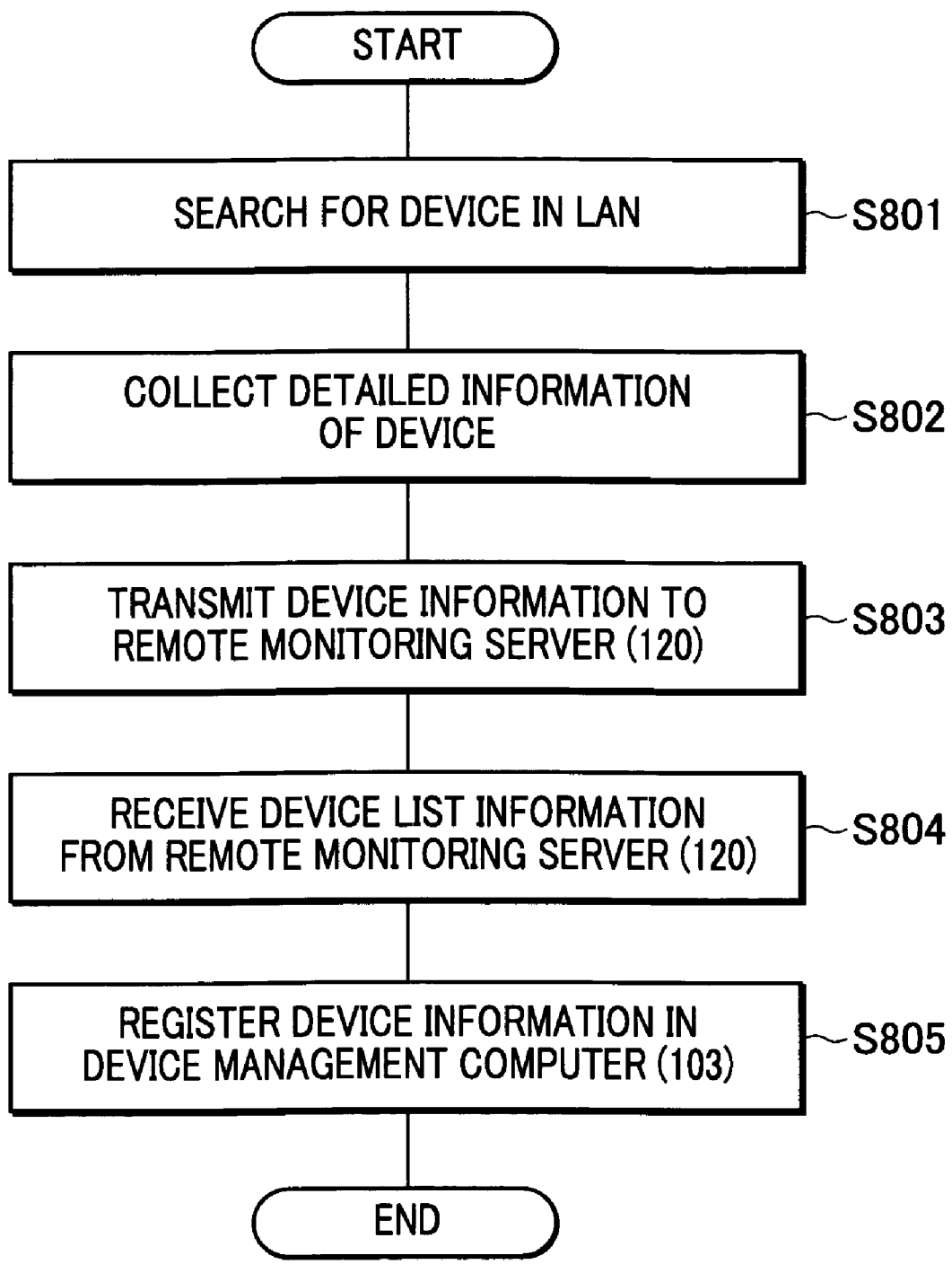
FIG. 8 is a flow chart of processing involved in holding a device list.

First, with reference to FIG. 8, a description is given to processes until management information as shown in FIG. 7 is held in the device management computer 103 and the remote monitoring computer 120. FIG. 8 shows exemplary processing of the device management computer 103 or the device 102, and the processing is accomplished such that a CPU provided in an apparatus that is to perform processing executes a program stored in the corresponding storing section.

First, in S801, devices 102 that can communicate over the network are searched for. In this searching, SNMP broadcast (a MIB, for example, "SysObjectID", that allows for identification of a device of interest is used) is employed, and upon transmission of a response from each device 102, device identification is performed.

In step S802, information, or data, required for registration with the remote monitoring computer 120 is collected from each device 102 that has transmitted a response. At this point, since the IP address of a device of interest has been acknowledged, the data collection can be made using SNMP or another protocol. Other than an IP address, examples of types of information to be collected include a product name and a MAC address.

In step S803, information obtained in step S802 is transmitted to the remote monitoring computer 120. At the remote monitoring computer 120 that has received the transmitted information, for example, information about a device not to be managed is deleted and various types of information about a device to be managed are modified and/or added. Modified information is transmitted back to the source device-management computer 103.

In step S804, the information that is transmitted from the remote monitoring computer 120 is received (downloaded), and in step S805, the received information is converted into a device list (which corresponds to FIG. 7) and is the held in an available format, thereby ending the process.

The flow in FIG. 8 is accomplished in this manner, and thus correct information for the device list to be managed by a client (i.e., a device management computer that is identified with a device management computer ID) is properly held in the device management computer 103 and the remote monitoring computer 120. It should be noted that, in practice, the device list that is held in the remote monitoring computer 120 includes information for a plurality of clients (device management computers that are identified with device management computer IDs).

A more detailed description is now given to the processing of the remote monitoring computer 120 in response to the above-described process of step S506 in FIG. 5.

When the notification is transmitted to the remote monitoring computer 120 in step S506, the corresponding device management computer 103 is identified with a device management computer ID 701 (a device management PC ID in FIG. 7) that is included in the notification. Then, a list of IP addresses and MAC addresses for a plurality of devices that are being managed by the identified device management computer 103 is extracted.

The remote monitoring computer 120 then determines whether one of the IP address and MAC address of each device which are included in the notification is included in the information of the extracted list (see FIG. 7).

For example, if an IP address and a MAC address which are included in the notification are "192.168.10.13" and "008500123456", respectively, as indicated by reference numerals 601 and 602 in FIG. 6, then it is determined that the IP address of a device having the MAC address being managed has been changed in comparison with those indicated by reference numerals 702 and 703 in FIG. 7.

Also, since the MAC address of a device whose IP address would have been changed is identified, a device (a product name) of interest and the like can also be identified in accordance with the list, shown in FIG. 7, by the remote monitoring computer 120. As a result, it is possible to more specifically notify service personnel of what device (product name) is causing a failure at a client side.

Also, if an IP address and a MAC address which are included in the notification is "192.168.0.1" and "008500123480", respectively, as indicated by reference numerals 603 and 604 in FIG. 6, then it is determined that the IP address being managed corresponds to a device having a MAC address not being managed, in comparison with those indicated by reference numerals 704 and 705 in FIG. 7. This can happen in a case in which an IP address that has been used is assigned to a new device. Further, since a product name can also be identified with an IP address in accordance with the list shown in FIG. 7, an identification can be made as to whether a product associated with an IP address is a NIC-compatible device (a device shown in FIG. 4) or a device having an on-board network-capability (as shown in FIG. 3). For example, service personnel or the like can be notified of the identified information, as reference information, via a communication device.

Also, when change of the IP address (device identification information) of a client is inevitable, a process is executed for automatically or manually changing the IP address, held in history information by the remote monitoring computer 120, of a corresponding device to be managed. This arrangement can realize tracking means for accurately tracking a history of a device to be managed, in such a scheme that accumulates histories of a device based on the IP address (device identification information) thereof.

In this manner, holding of management information, as shown in FIG. 7, in at least the remote monitoring computer 120 allows the remote monitoring computer 120 to perform processing more efficiently in response to the abnormality notification process (in step S506 of FIG. 5) in the device management computer 103. Such processing of the remote monitoring computer 120 allows the service personnel to be more efficiently notified and more specifically instructed.

Figure 9:
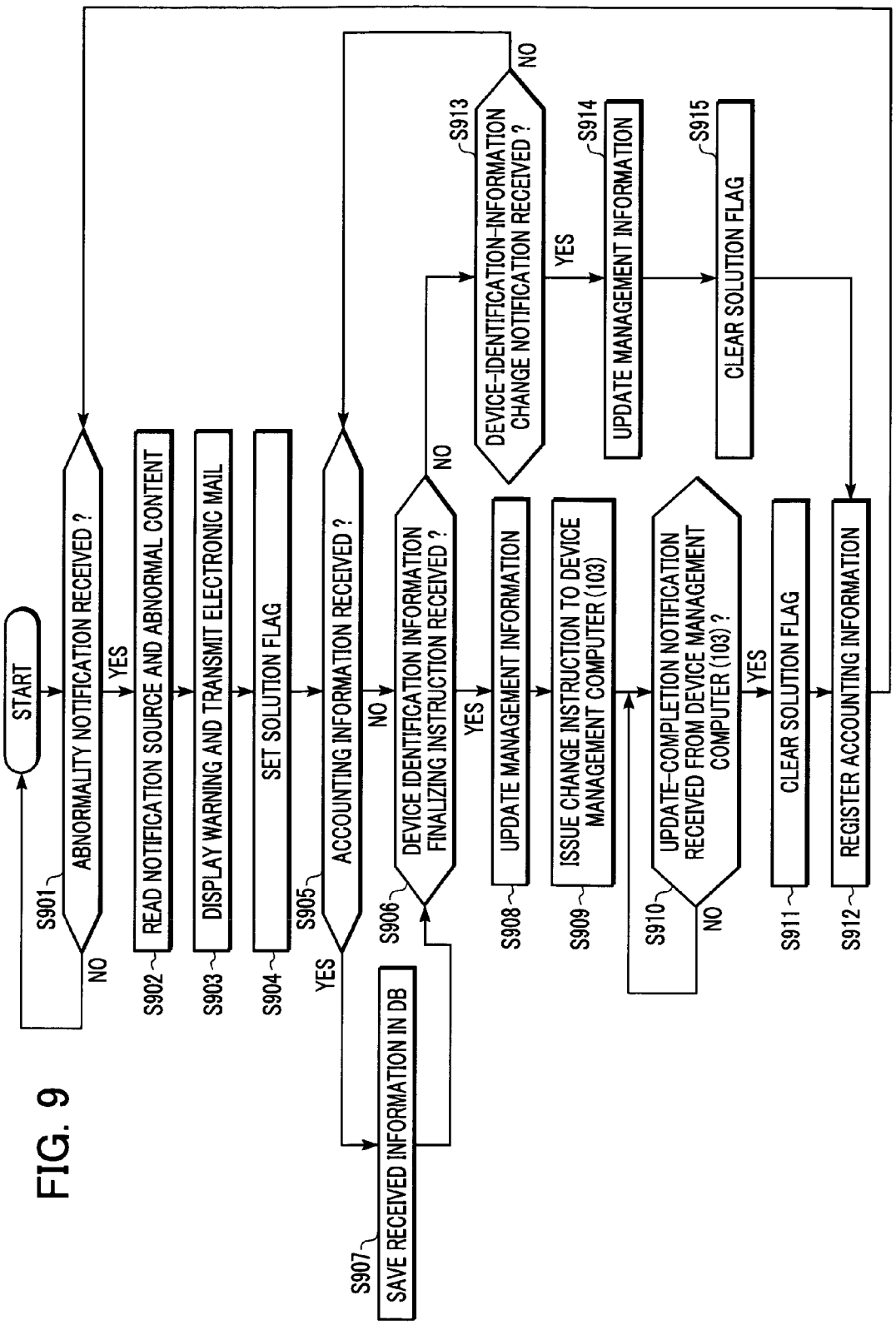
FIG. 9 is a flow chart of processing executed by a remote monitoring computer.

Next, a flow of processing executed by the remote monitoring computer 120 in response to a change of device identification information will be described with reference to FIG. 9. The processing in the flow chart of FIG. 9 is one example, and thus, needless to say, one or some of the individual steps may be processed by another apparatus to achieve the flow in FIG. 9.

First, in step S901, a determination is made as to whether an abnormality notification regarding device identification information is received.

An abnormality notification may be input to the remote monitoring computer 120 from the device management computer 103 through the communications line 109 shown in FIG. 1 or may be input by an operator at the remote monitoring computer 120 via an input device such as a keyboard.

When it is determined in step S901 that there is an abnormality regarding device identification information, the process proceeds to step S902, or otherwise, another processing is executed.

In step S902, in accordance with the input information, the source of the abnormality notification and abnormal content are read by the remote monitoring computer 120 and display is performed based on the read information.

In step S903, electronic mail is generated based on the information read in step S902 and the generated electronic mail is transmitted.

Then, a solution flag is set in step S904. This solution flag is cleared when a problem regarding device identification information is eliminated. In other words, a period in which the flag is set indicates that a problem is yet unsolved. Thus, for example, a module for periodically monitoring the solution flag may be provided to warn the operator or the like of the presence of an unsolved problem when the solution flag is set, thereby making it possible to facilitate solution of an unattended problem. This solution flag is adapted to represent a unique problem that occurs and can be used to identify, for example, the ID of a device management computer having a problem, a corresponding device ID, and a problematic matter.

In step S905, a determination is made as to whether accounting information is received. The accounting information can be received from any device management computer 103 or can be received from one of the devices via a predetermined apparatus without going through the device management computer 103. When it is determined "Yes" in step S905, the process proceeds to step S907. When it is determined "No", the process proceeds to step S906.

In step S907, a process is executed for saving and holding the accounting information, received in step S905, in a database without properly associating the accounting information with a given device management computer, device, or client. Accounting information to be saved may be given identification information that representing save-accounting information, so that the remote monitoring computer 120 can easily identify accounting information to be saved.

For example, when accounting information for a device associated with an abnormal IP address is received and the accounting information is held using the association with the abnormal IP address, a problem arises in that accounting information for a device associated with the wrong IP address is updated and wrong accounting information is generated. The processing according to step S907, however, allows for ensured management of accounting information to be achieved. That is, accounting information based on an image forming operation of a predetermined device is generated by the device management computer 103 and is transmitted to the remote monitoring computer 120. Then, upon receiving the accounting information, the remote monitoring computer 120 is adapted to save the accounting information, in accordance with a device identification information notification that has been separately transmitted in advance based on the device-identification-information comparison result obtained by the device management computer 103.

In step S906, on the other hand, a determination is made as to whether an instruction for finalizing a change of device identification information is input. This instruction for finalization is input by, for example, operation of a keyboard and mouse by the operator at the remote monitoring computer 120. Such an operation is executed, for example, when service personnel visits a client to confirm the change of the IP address of a given device and the operator at the remote monitoring computer 120 is notified of the confirmed information. A telephone, electronic mail, or the like may be used as means for notifying the operator of the confirmed information.

When it is determined "Yes" in step S906, the management information (shown in FIG. 7), which is held in accordance with input of the instruction for finalizing device identification information in step S906, is updated in step S908. The term "instruction for finalization" herein referrers to an instruction for inputting changed device identification information (including, at least, an IP address and/or a MAC address) and/or unchanged device identification information. Naturally, such device identification information is associated with a predetermined device management computer or a predetermined device, and such associated information is also input together in step S906.

In step S909, in accordance with the process in step S908, the finalized device identification information and the associated information are issued to the device management computer 103 through the communications network 109. In accordance with an instruction for updating the combination of the first device identification information and the second device identification information from the remote monitoring computer 120, the device management computer 103 updates corresponding first device identification information and second device identification information which are held in a holding section. In this case, communication information including the IP address of the device management computer 103 that manages the corresponding device (image forming apparatus) whose device identification information is finalized is also held. Based on the held communication information, the remote monitoring computer 120 and the device management computer 103 communicate with each other. The device management computer 103 that has received the instruction issued in step S909 performs a process for updating the corresponding device identification held by the holding section to designated information in accordance with a device ID included in the associated information. When the same device identification information (an IP address and/or a MAC address) as the previous information is designated, the device identification information is not updated, and when designated device identification information has been changed, a change process is performed.

Meanwhile, even when a change of device identification information is finalized by the remote monitoring computer 120 to the same information used before or different information, the device (image forming apparatus) 102 or the device management computer 103 may, for example, generate accounting information in accordance with wrong device identification information and notify the remote monitoring computer 120 of the generated accounting information. According to the present invention, execution of the process in step S909 by the remote monitoring computer 120 can provide an advantage in that such incorrect processing can be efficiently prevented. In other words, the present invention can provide a particular advantage in that device identification information updated by the remote monitoring computer 120 can be promptly reflected in the device management computer 103.

In step S910, a determination is made as to whether a notification, indicating that the device management computer 103 has successfully completed the update in response to the process of step S909, is issued from the device management computer 103.

When it is determined "No" in step S910, the notification issued from the device management computer 103 is waited for, and when it is determined "Yes", the process proceeds to step S911.

In step S911, the solution flag set in step S904 is cleared. The process for clearing the solution flag refers to, for example, a process for changing the value of the flag from "0" to "1".

In step S912, based on the finalization of change of the device identification information, the accounting information saved in step S907 is formally registered in accordance with the finalized device identification information.

On the other hand, when it is determined "No" in step S906, the process proceeds to step S913, in which a determination is made as to whether a device-identification-information change notification is received.

This device identification-information change notification corresponds to a notification issued from communication control means in the device management computer 103 when device identification information is input via inputting means, which is used for inputting an instruction for updating the IP address and/or the MAC address of the device management computer 103.

The inputting means at the device management computer 103 may be implemented with, for example, the keyboard 206, which is instruction inputting means, shown in FIG. 2. Naturally, a dedicated input screen or inputting means may be provided to input a change of device identification information. Device identification information may also be changed upon the occurrence of an abnormality in device identification information in such a manner that the service personnel visit a client and change the device identification information using the device management computer 103. This can reduce loads on, for example, operator telephone assistance at the remote monitoring computer 120 and inputting work for changing device identification information. This arrangement can further offer a particular advantage in that not only can the remote monitoring computer 120 issue an instruction for changing device identification information, so can the device management computer 103, thereby achieving a flexible scheme for maintenance of an image forming apparatus.

Also, in some cases, even when discrepancy of an IP address and/or a MAC address has been solved at the device management computer 103, a need may arise for asking the user again from the remote monitoring computer 120 or for dispatching service personnel. The present invention can provide another particular advantage in that such need can be minimized.

Further, in step S914, the management information including device identification information held by the remote monitoring computer 120 is updated, and in step S915, the solution flag is cleared in the same manner as in step S911. Thereafter, the above-described process in step S912 is executed and the process returns to step S901.

FIG. 10 shows one example of information input in step S901.

Columns 1001, 1002, and 1003 indicate corresponding items. A row 1004 indicates a type of notification. In this case, a device-identification-information change notification is illustrated, however, other types of notification, for example, an accounting-information notification and a device-error (e.g., paper jam) notification, may also be input.

A row 1005 indicates the ID of a device monitoring computer that monitors a device in which an abnormality occurs.

A row 1006 indicates the ID of a device of interest, and rows 1007 and 1008 indicate an IP address and a MAC address which are obtained by a user's device management computer, respectively, in association with the device ID in the row 1006. These IP address and MAC address are accompanied by information as to whether or not a change has been made to the originally designated IP address and/or MAC address. The use of the content of the notification shown in FIG. 10 allows the remote monitoring computer 120 to recognize whether or not a change has been made to the IP address and/or the MAC address of the user device.

Figure 11:
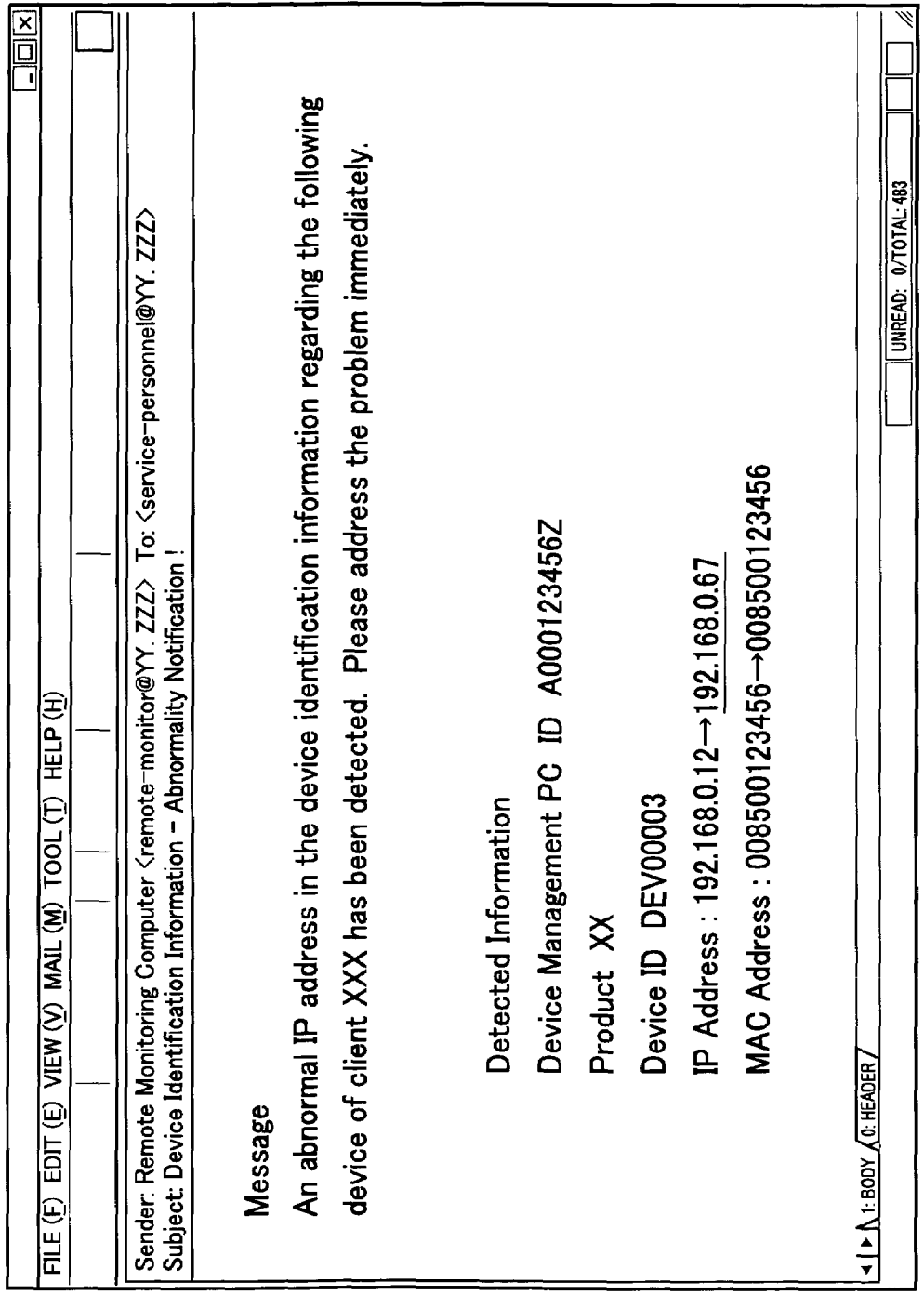
FIG. 11 is a view showing the content of electronic mail generated and transmitted by the remote monitoring computer in response to an abnormality notification.

FIG. 11 shows content of electronic mail that is generated and transmitted in the process of step S903 shown in FIG. 9.

In FIG. 11, the sender is a remote monitoring computer 120 and the destination is service personnel. The address of the service personnel can be directed to the electronic mail address of a specific service person or a common address of the service personnel.

The message in the electronic mail shown in FIG. 11 includes text indicating whether an abnormality was found in the IP address or the MAC address of device identification information of a device being managed.

Information that is detected includes a product name of a device of interest, an IP address, and a MAC address, as well as information that is displayed to allow for identification of changed device identification information (the IP address in FIG. 11). In FIG. 11, a change of the IP address from "192.168.0.12" to "192.168.0.67" is shown.

The remote monitoring computer 120 automatically or semi-automatically creates electronic mail as described above upon acknowledging the abnormality notification in step S901 shown in FIG. 9, and can transmit the electronic mail to service personnel, thereby efficiently prompting the service personnel to process the step S913. For example, when service personnel is visiting a client for another purpose, the service personnel can receive electronic mail as shown in FIG. 11 with a predetermined equipment and can efficiently input a device-identification-information change, which corresponds to the notification in step S913, to the device management computer 103.

Figure 12A:
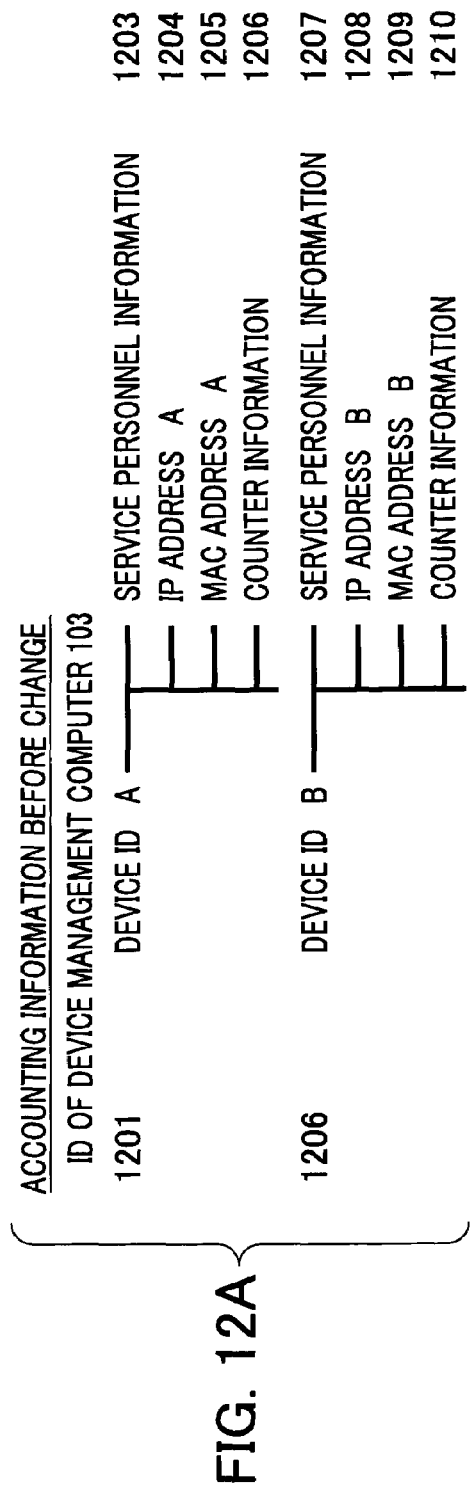
FIGS. 12A and 12B each show an exemplary format of accounting information held by the remote monitoring computer.
Figure 12B:
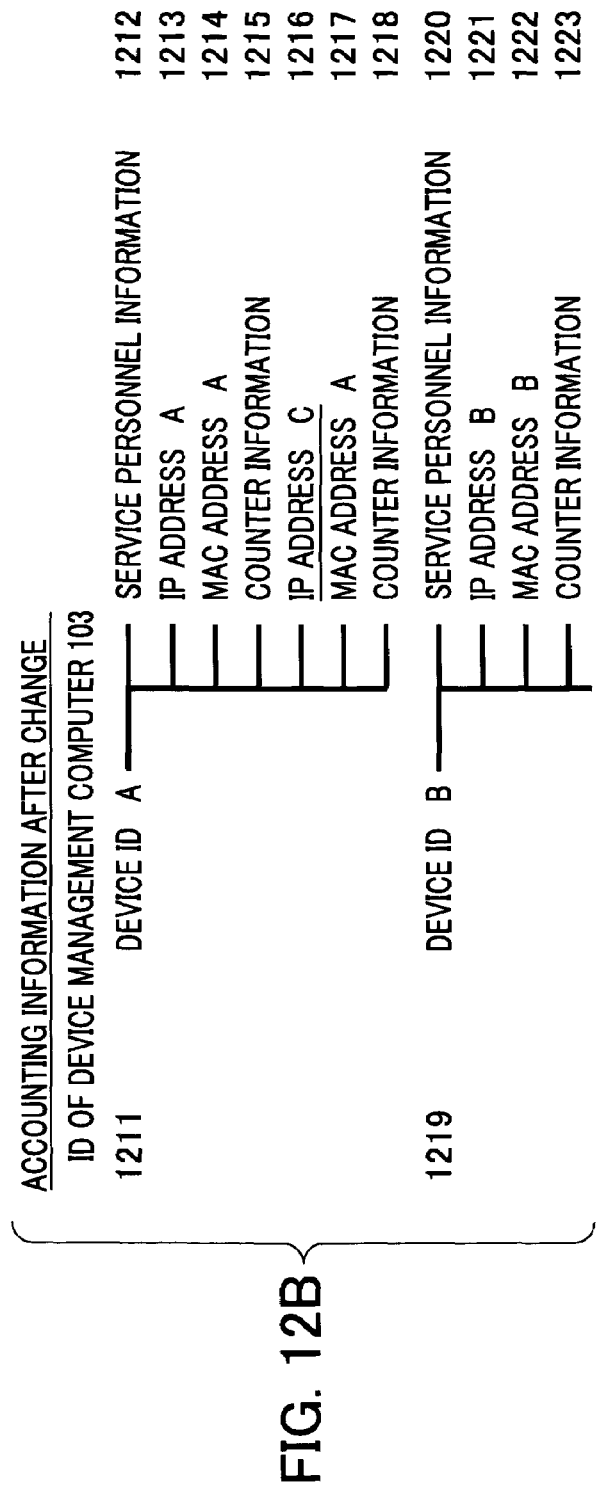

FIGS. 12A and 12B show an exemplary format of accounting information for a given device that is managed by the remote monitoring computer 120.

FIG. 12A shows an exemplary format of accounting information before being changed, for example, of accounting information before the process in step S912 shown in FIG. 9 is performed. FIG. 12B shows an exemplary format of accounting information after being changed, for example, of accounting information after the accounting-information registration process in step S912 shown in FIG. 9 is performed.

In FIGS. 12A and 12B, reference numerals 1204 and 1205, 1208 and 1209, 1213 and 1214, 1216 and 1217, and 1221 and 1222 indicate attributes of counter information 1206, 1210, 1215, 1218, and 1223, respectively.

FIG. 12B shows a case in which a change for a device having a device ID A, which was originally managed by being associated with the IP address A 1213, has been finalized such that it is to be managed by being associated with the IP address C 1216.

For example, in FIG. 11, the IP address is changed from "192.168.0.12" to "192.168.0.67" relative to that shown in FIG. 7. In such a case, when an instruction for changing the IP address is issued in step S906 shown in FIG. 9, the accounting information to be managed becomes information shown in FIG. 12B.

Also seen from FIG. 12B is that the counter information 1215 for the device ID A that is originally managed under the device identification information 1213 and 1214 is updated to be managed under the device identification 1216 and 1217.

After being updated, device-ID A's accounting information that is transmitted from the device management computer 103 is managed by being associated with the device identification information 1216 and 1217.

While the above description is given to a case in which an IP address is changed by way of example, the same processing is also applicable to a case in which a MAC address is changed. In such a case, needless to say, the flow shown in FIG. 9 can also be executed as in the case of the IP address.

In addition, when a new device is confirmed in accordance with the flow chart of FIG. 9 as a device to be managed, a process is executed for registering new accounting information, as shown in FIG. 12, including the device ID of the new device, service-personnel information, and attributes (an IP address and a MAC address) for counter information, in a database.

As described above, even when a change is made to device identification information (an IP address and/or a MAC address) of a predetermined device for some reason, execution of the flow in FIG. 9 allows for accurate recognition of the fact of change and allows for improved failsafe management of accounting information, thereby making it possible to provide a user with a reliable maintenance system for an image forming apparatus.

According to another embodiment of the present invention, in the above-described process in step S907 shown in FIG. 9, accounting information that is received from the device management computer 103 is saved by an external apparatus to prevent a problem associated with accounting.

Second Embodiment

In a second embodiment, ensure management of accounting information will be described in conjunction with an alternative to the first embodiment. Since the configurations discussed with reference to FIGS. 1 to 4 and processes based on the flow charts and methods for holding various types of information which are discussed with reference to FIGS. 6 to 12 are essentially the same, detailed descriptions thereof will be omitted. In this case, differences from the first embodiment will be particularly described in detail.

In the second embodiment, accounting management is ensured such that accounting information is created by the device management computer 103 based on an image forming operation of a predetermined device and issuance of a notification of the generated accounting information to the remote monitoring computer 120 is restricted.

For example, the device management computer 103 is configured to recognize a solution flag as illustrated in FIG. 9. In this case, when a solution flag is set (i.e., a problem is not solved), accounting information based on information obtained from a plurality of devices (image forming apparatuses) is restricted from being issued to the remote monitoring computer 120. This can also provide at least the same advantages as the processing in FIG. 9.

In addition, when the issuance of a notification of accounting information to the remote monitoring computer 120 is restricted, information indicating that the issuance of accounting information is being restricted may be transmitted instead of accounting information. This allows for, on the remote monitoring computer side, prompt dispatch of service personnel and prompt telephone/electronic-mail inquiry to the user, and the like, and also can prevent confusion at the remote monitoring computer 120.

In this case, as a method for generating a solution flag at the device management computer, a solution flag may be set by the device management computer 103 when detection (which corresponds to step S901) of abnormal device identification information is performed by the device management computer 103. Alternatively, the states of the solution flags in steps S904, S911, and S915 may be reflected in the device management computer 103 through the communications line 109.

Then, in accordance with such a solution flag, a determination is made as to whether a problem regarding a combination of the first device identification information and the second device identification information is solved. When it is determined as being solved, accounting information that has been restricted may be transmitted to the remote monitoring computer 120. In such a case, updated device identification information is transmitted to the remote monitoring computer 120 prior to the transmission of accounting information, in the same manner described in connection with step S913. Thus, the remote monitoring computer 120 can perform accurate accounting management.

Provision of the configuration described above for the device management computer 103 can eliminate the need for the process in step S907 shown in FIG. 9, thereby offering an advantage in that the processing at the remote monitoring computer 120 can be simplified.

Other Embodiments

The above-described object of the present invention can also be achieved by a recording medium in which software program code that realizing the features of the illustrated embodiments. That is, the object of the present invention can be achieved such that a recording medium in which such program code is recorded is supplied to a system or apparatus and a computer (or CPU or MPU) of the system or the apparatus reads and executes the program code.

In such a case, the program code read from the recording medium achieves the novel features of the present invention and the recording medium in which the program code is recorded is also encompassed by the present invention.

Examples of available recording media for supplying the program code include a floppy® disk, hard disk, optical disk, magnetic optical disk, CD-ROM, CD-R, DVD-ROM, magnetic tape, nonvolatile memory card, and ROM.

Further, not only is the program code that is read from the computer executed to achieve the features of the illustrated embodiments, but also an OS (operating system) or the like that is running on the computer may perform part or all of the actual processing in accordance with an instruction of the program code to achieve the features of the illustrated embodiments. Naturally, such an arrangement is also covered by the present invention.

Additionally, after the program code read from the recording medium is stored in a memory that is provided in a plug-in board inserted to the computer or an expansion unit connected to the computer, a CPU or the like that is provided in the plug-in board or the expansion unit may perform part or all of the actual processing in accordance with an instruction of the program code to achieve the features of the illustrated embodiments. Such an arrangement is also encompassed by the present invention.

When the present invention is applied to the recording medium described above, program codes for realizing the above-described flows, displaying each screen, and processing various databases are stored in the recording medium.

As described above, the present invention allows for appropriate and prompt dispatch of service personnel and accurate change of various settings when the remote monitoring computer receives a device setting change.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus that manages a predetermined printing device for performing communication over a network, the apparatus comprising:
   a holding unit configured to hold device identification information corresponding to the predetermined printing device, the device identification information including first device identification information and second device identification information;
   an obtaining unit configured to obtain accounting information including a number of sheets printed, based on an image forming operation from the predetermined printing device;
   a determination unit configured to compare a combination of a first device identifier and a second device identifier received from the predetermined printing device with the device identification information held by said holding unit, and determine whether at least one of the first device identifier and the second device identifier is being managed;

a communication controlling unit configured to issue a notification to an external apparatus if said determination unit determines that the first device identifier is not being managed and the second device identifier is being managed or if said determination unit determines that the first device identifier is being managed and the second device identifier is not being managed, and not to issue the notification to the external apparatus if said determination unit determines that neither the first device identifier nor the second device identifier is being managed, the external apparatus being capable of receiving the notification through a predetermined communications line and managing a plurality of information processing apparatuses; and an updating unit configured to update the device identification information held by said holding unit in accordance with an update notification, for updating a combination of the first device identification information and the second device identification information, from the external apparatus, wherein the notification issued by said communication controlling unit includes information indicating that either the first device identifier or the second device identifier is not being managed, wherein, if said determination unit determines that the first device identifier is being managed and the second device identifier is not being managed or if said determination unit determines that the first identifier is not being managed and the second device identifier is being managed, said communication controlling unit restricts notifying the external apparatus of the accounting information obtained from the predetermined printing device by said obtaining unit until the device identification information is updated by said updating unit, and wherein the first device identification information includes internet protocol address information, and the second device identification information includes media access control (MAC) address information.

2. An information processing apparatus according to claim 1, further comprising a receiving unit configured to receive the device identification information from the external apparatus through the communications line.

3. An information processing apparatus according to claim 1, further comprising an inputting unit configured to input an instruction for updating at least one of the first device identification information and the second device identification information, wherein said communication controlling unit issues a notification for update, based on the update instruction input by said inputting unit, to the external apparatus.

4. An information processing method for an information processing apparatus that manages a predetermined printing device for performing communication over a network, the method comprising:

holding device identification information corresponding to the predetermined printing device, the device identification information including first device identification information and second device identification information;

obtaining accounting information including a number of sheets printed, based on an image forming operation from the predetermined printing device;

comparing a combination of a first device identifier and a second device identifier received from the predetermined printing device with the device identification information, and determining whether at least one of the first device identifier and the second device identifier is being managed;

controlling issuance of a notification to notify an external apparatus if a determination is made that the first device identifier is not being managed and the second device identifier is being managed or if a determination is made that the first device identifier is being managed and the second device identifier is not being managed, and not to issue the notification to the external apparatus if a determination is made that neither the first device identifier nor the second device identifier is being managed, the external apparatus receiving the notification through a predetermined communications line and managing a plurality of information processing apparatuses; and updating the device identification information in accordance with an update notification, for updating a combination of the first device identification information and the second device identification information, from the external apparatus, wherein the notification includes information indicating that either the first device identifier or the second device identifier is not being managed, wherein, if a determination is made that the first device identifier is being managed and the second device identifier is not being managed or if a determination is made that the first device identifier is not being managed and the second device identifier is being managed, notifying the external apparatus of the accounting information obtained from the predetermined printing device is restricted until the device identification information is updated, and wherein the first device identification information includes internet protocol address information, and the second device identification information includes media access control (MAC) address information.

5. An information processing method according to claim 4, further comprising receiving the device identification information from the external apparatus through the communications line.

6. An information processing method according to claim 4, further comprising:

inputting an instruction for updating at least one of the first device identification information and the second device identification information via an input section, wherein a notification for update is issued, based on the update instruction, to the external apparatus.

7. A recording medium that is readable by a computer storing a program that is executed by an information processing apparatus that manages a predetermined printing device for performing communication over a network, the program including instructions that, when executed by the information processing apparatus, cause the information processing apparatus to perform a method comprising:

holding device identification information corresponding to the predetermined printing device, the device identification information including first device identification information and second device identification information;

obtaining accounting information including a number of sheets printed, based on an image forming operation from the predetermined printing device;

comparing a combination of a first device identifier and a second device identifier received from the predetermined printing device with the device identification, and determining whether at least one of the first device identifier and the second device identifier is being managed;

controlling issuance of a notification to an external apparatus if a determination is made that the first device identifier is not being managed and the second device identifier is being managed or if a determination is made that the first device identifier is being managed and the second device identifier is not being managed, and not to issue the notification to the external apparatus if a determination is made that neither the first device identifier nor the second device identifier is being managed, the external apparatus receiving the notification through a predetermined communications line and managing a plurality of information processing apparatuses; and updating the device identification information in accordance with an update notification, for updating a combination of the first device identification information and the second device identification information, from the external apparatus, wherein the notification includes information indicating that either the first device identifier or the second device identifier is not being managed, wherein if a determination is made that the first device identifier is being managed and the second device identifier is not being managed or a determination is made that the first device identifier is not being managed and the second device identifier is being managed, notifying the external apparatus of the accounting information obtained from the predetermined printing device to the external apparatus is restricted until the device identification information is updated, and wherein the first device identification information includes internet protocol address information, and the second device identification information includes media access control (MAC) address information.

* * * * *